March 24, 1931.   C. H. RYMAL   1,797,697
SEPTIC TANK
Filed March 8, 1930
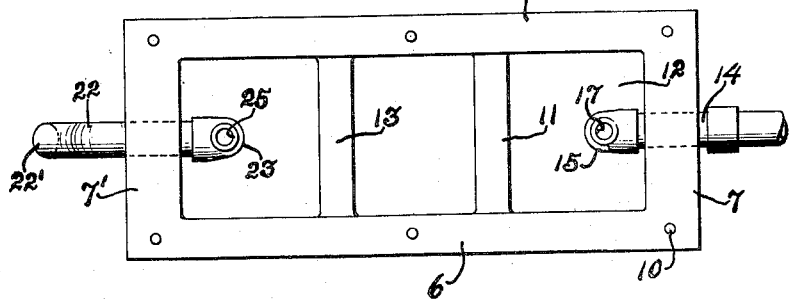
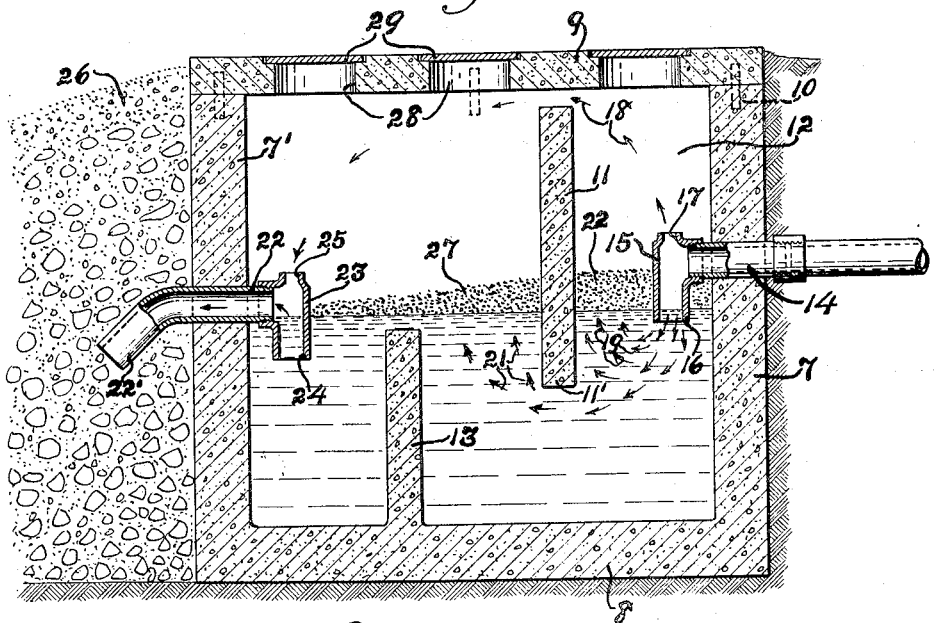
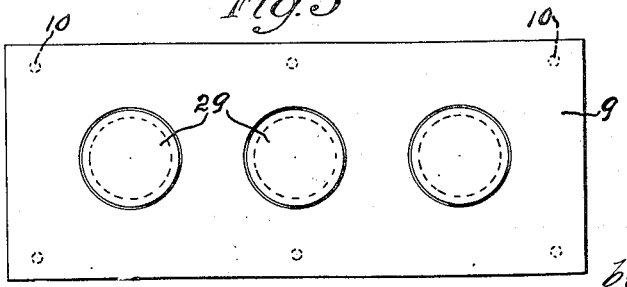
Inventor
Cecil H. Rymal
by J. Daniel Stuwe.
Attorney.

Patented Mar. 24, 1931

1,797,697

UNITED STATES PATENT OFFICE

CECIL H. RYMAL, OF CHICAGO, ILLINOIS, ASSIGNOR OF ONE-HALF TO GEORGE R. GREGORY, OF CHICAGO, ILLINOIS

SEPTIC TANK

Application filed March 8, 1930. Serial No. 434,184.

This invention relates to improvements in septic tanks.

One of the main objects of this invention is to provide an inexpensive and efficient septic tank which will effectively liquefy the sewage and produce a clear effluent. Another object is to arrange the construction so as to provide convenient access to the tank and inspection of the various parts therein, and also to provide for cleaning-out the inlet means and the outlet means within the tank, whenever the same may become necessary. A further object is to arrange the inlet means and the outlet means and the partition walls in the tank so as to provide for a downward flow of the sewage from said inlet means and an upward flow of air from said means, toward the outlet means, and provide a primary bacteria chamber for forming a heavy bacteria blanket therein.

These and other objects and advantages are attained with this invention, as will become apparent from the following description, taken in connection with the accompanying drawing, in which Fig. 1 is a plan view of a septic tank embodying my invention, and having the top member removed therefrom.

Fig. 2 is a longitudinal vertical sectional view showing this tank in operation, and showing a portion of the filtration bed associated therewith.

Fig. 3 is a plan view of the tank.

The form of tank illustrated herein comprises a tank body which includes side walls 6, and end walls 7 and 7', at the inlet end and at the outlet end of the tank, respectively; and a bottom wall or floor 8 is provided for said side and end walls. A top wall or cover 9 is removably mounted on said walls 6, 7, and 7', as by means of pegs or pins 10 which project into the top wall and into the walls of the body, each being preferably held fixed with one end in one wall and having its other end engaging slidably in a hole or bore provided in the associated wall.

A partition wall 11 extends from one side wall to the other, near the end wall 7 at the inlet end of the tank, providing a primary partition wall and forming a primary or main bacteria chamber 12 between it and the end wall 7. Said partition wall 11 has its lower end 11' spaced or separated from the bottom wall 8 to provide a passage for the flow of sewage beneath said lower end; and said wall 11 is also arranged or spaced from the top wall 9 to provide an air passage at the upper end of the tank. A second partition wall 13 extends from side wall to side wall, and arises from bottom wall 8 to a position higher than said lower end 11' of partition wall 11, so that the adjacent ends of these partition walls are in overlapping relation to each other and produce a check or rebound to the flow of sewage in the tank.

An inlet conduit 14 extends through end wall 7 into the tank and has an inlet member or means 15 on its inner end for feeding or discharging sewage into the tank. Said means 15 is preferably arranged in the form of a T, having its discharge end or mouth 16 extending downward, so as to feed or direct the sewage downwardly into the primary chamber 12; and said means has an air vent or air outlet 17 at its upper end to direct foul air upwardly in said primary chamber and enable it to flow through the passage provided over partition wall 11, as indicated by the group of arrows 18 at the upper end of the tank in Fig. 2. The lower end 11' of wall 11 is extended sufficiently downwards below mouth 16 to provide for the rebounding of a large portion of the sewage and to cause its return upward flow within the primary bacteria chamber, as indicated by the arrows 19 therein, so as to produce a heavy or main bacteria blanket 20 therein, for directly attacking the solid matter in the sewage and effectively proceeding with the liquefaction process.

Another chamber is formed between partition walls 11 and 13, wherein the flow of the fluid is directed upwardly, as indicated by the arrows 21; and an end chamber or outlet chamber is formed between partition wall 13 and end wall 7', wherefrom the fluid is discharged as a substantially clear effluent from the tank.

An outlet conduit 22 extends through end wall 7' at the outlet end of the tank, and has an outlet member or means 23 provided on its inner end for receiving and carrying away the fluid from the tank. Said means 23 is preferably arranged in the form of a T, similar to means 15, having an intake mouth 24 at its lower end, and an air vent or air intake mouth 25 at its upper end to receive and carry away the foul air flowing from vent 17 over partition wall 11, as indicated by arrows 18 in Fig. 2. The outer end 22' of this conduit is preferably bent downwardly from the horizontally extending main part, and empties into a filtering bed 26, which is made of suitable material, like a mixture of broken stones or bricks and torpedo sand and silica sand.

A second or secondary bacteria bed or bacteria blanket 27 forms upon the fluid present in the last two chambers between walls 11 and 13 and walls 13 and 7'. Said blanket is heavier or thicker at the inner end adjacent wall 11, and is comparatively thin adjacent the outlet means 23 and end wall 7' at the outlet end of the tank, in a manner as indicated in Fig. 2.

In this construction the mouth 24 is placed lower than the upper end of partition wall 13, and the mouth 16 is placed lower than the lower portion of the horizontal main part of conduit 22, both mouths thus being immersed in the fluid. The foul air from inlet conduit 14 passes through air vent 17, over wall 11, and into vent 25, to be drawn and discharged along with the fluid passing out through outlet conduit 22. By this construction it is furthermore found that a heavy or main bacteria blanket 20 is formed in the primary chamber 12; where a direct and strong action takes place in the liquefaction process, which is fully completed in the following chambers, with the secondary bacteria blanket 27; and wherefrom a substantially clear effluent is discharged through conduit 22 into the filtering bed.

This tank is also arranged to provide convenient access to the various parts located therein; and in addition to the removability of the cover 9 from the tank body, I furthermore provide this cover with manholes 28 having removable covers or lids 29 thereon, one being provided over each chamber, substantially as indicated in the drawing. This arrangement thus provides for convenient and prompt access to the various parts within the tank, and provides for convenient rodding-out or cleaning-out of inlet means 15 particularly, in case said means has after extended use become clogged by greases and the like, from the kitchen sink stack, laundry tubes, etc.

The form of tank illustrated herein is made of cement, including a material to resist acid and avoid deterioration; and it may also be made of non-rustable metal, and other suitable material.

The bottom or floor is needed on the tank when it is installed in soft material, as quick-sand; but this floor may be dispensed with when the tank is built on firm material, as clay.

What I claim as my invention and desire to secure by Letters Patent is:

1. A septic tank comprising top and bottom and side and end walls, a plurality of partition walls extending from side wall to side wall, the first one of which is spaced a distance from the end wall and from the bottom wall to provide a passage for liquid and is spaced slightly from the top wall to provide an air passage, while the succeeding partition wall arises from the bottom wall and extends slightly higher than the lower end of the said first partition wall, inlet and outlet conduits having inlet and outlet means thereon adjacent said end walls, each of said means having a downwardly directed mouth at the lower end for the liquid and a small upwardly directed opening for an air vent to enable the flow of air through said air passage from the inlet vent to the outlet vent, the mouth on the inlet means being positioned below the lower part of the outlet conduit in the end wall and being slightly above and spaced from the lower end of the first partition wall, for enabling the rebounding and upward flow of part of the sewage forwardly of said first partition wall and the formation of a heavy bacteria blanket between it and the adjacent end wall and the formation of a secondary bacteria blanket beyond said first partition wall.

2. A septic tank comprising top and bottom and side and end walls, a plurality of partition walls extending from side wall to side wall, the first one of said partition walls being spaced a distance from the end wall and from the bottom wall to provide a passage for the sewage and being spaced slightly from the top wall to provide an air passage, while the second partition wall arises from the bottom wall and extends slightly higher than the lower end of said first wall, inlet means and outlet means adjacent the two end walls each being spaced from the nearest partition wall, each means having a downwardly directed mouth at the lower end for the liquid and a small upwardly directed opening at the top for an air vent for the flow of air through said air passage from the inlet vent to the outlet vent, the mouth on the inlet means being slightly above said lower end of the first wall to provide for the rebounding and upward flow of part of the sewage forwardly of said first wall and the formation of a heavy bacteria blanket between it and the adjacent end wall, and the mouth on the outlet means being just below the top of the second partition wall and below the top of the liquid, thereby producing a thin secondary bacteria blanket.

3. A septic tank comprising top and bottom and side and end walls, a plurality of partition walls extending parallel and entirely across from side wall to side wall, the first one of said partition walls being spaced a distance from the bottom wall to provide a passage for the sewage therebeneath and being spaced slightly from the top wall to provide an air passage thereabove, the next partition wall arising from the bottom wall and extending slightly higher than the lower end of said first wall, inlet means and outlet means adjacent the opposite end walls, each means being spaced from the end wall and from the nearest partition wall and consisting of a member having a mouth for the liquid it the lower end and a small opening at the top for an air vent for the flow of air through said air passage from the inlet vent to the outlet vent, the mouth on the inlet means being spaced from and being slightly higher than said lower end of said first wall to provide for the rebounding and upward flow of part of the sewage forwardly of said first wall and the formation of a primary heavy bacteria blanket between it and the adjacent end wall, the mouth on the outlet means being positioned slightly below the top of the adjacent partition wall, and said top and mouth being positioned below the surface of the liquid, whereby a thin secondary bacteria blanket is produced between said first wall and said outlet means and which is thinnest between said outlet means and said adjacent partition wall.

4. A septic tank comprising partition walls and inlet and outlet means whereby several chambers are provided to form a heavy primary bacteria blanket in the first chamber and a lighter secondary bacteria blanket in the chambers following, said inlet means being provided with a T-member having a lower sewage mouth and a small upper air vent alined with the mouth and adapted to pass a rod therethrough, a top wall on the tank, and readily removable lid means in said top wall in alinement with said air vent and said mouth to pass a rod therethrough for convenient rodding-out of said inlet means.

5. A septic tank comprising a plurality of partition walls, the first wall being spaced from the bottom of the tank and the succeeding wall being integral with the bottom and being spaced from the top of the tank in slightly overlapping relation with said first wall, to cause a heavy primary and a lighter secondary bacteria in said chambers, an inlet means within the tank and having a downwardly directed discharge mouth for sewage also a small upwardly extending and directed vent for air, a removable top member on the tank provided with a hole therein positioned above said air vent, and a readily removable lid for said hole to enable convenient inspection and entering of a rod through said hole and vent and mouth for readily rodding-out said inlet means.

6. A septic tank of rust-resisting material comprising a rectangular body having a bottom and side and end walls and a top removably mounted thereon, a plurality of partition walls extending parallel and entirely across from side wall to side wall, thereby providing a plurality of chambers, the first wall being spaced a distance from the bottom wall to provide a passage for sewage therebeneath and being spaced slightly from the top to provide an air passage thereabove, the next wall arising from the bottom wall and extending slightly higher than the lower end of the first wall, inlet and outlet conduits having T-shaped inlet and outlet means secured on the inner ends, each of said means having a lower mouth placed below the top of the liquid in the tank and having a small upper opening for an air vent, and small readily removable lid means in said top to provide for convenient inspection and to enable entering a rod therethrough and through said vent and mouth in said inlet means for conveniently cleaning the same, each of said mouths being spaced slightly from the end wall and considerably from the nearest partition wall, whereby said construction provides a primary chamber between said first partition wall and the nearest end wall for the formation therein of a heavy primary bacteria blanket, and provides other chambers beyond said first wall for the formation therein of a continuous gradually diminishing secondary bacteria blanket which extends above said next partition wall and forms therebeyond a thin final bacteria blanket, to produce a substantially clear effluent.

In testimony whereof I have signed my name to this specification.

CECIL H. RYMAL.